United States Patent [19]
Weisser

[11] Patent Number: 5,373,767
[45] Date of Patent: Dec. 20, 1994

[54] TRIMMING TOOL FOR TRIMMING DRAWN PARTS AND FOR SIMULTANEOUS TRANSVERSE CUTTING

[75] Inventor: Karl Weisser, Sindelfingen, Germany

[73] Assignee: Mercedes-Benz AG, Germany

[21] Appl. No.: 47,441

[22] Filed: Apr. 16, 1993

[30] Foreign Application Priority Data

Apr. 16, 1992 [DE] Germany .............. 4212745

[51] Int. Cl.⁵ .............................. B21D 24/16
[52] U.S. Cl. ............................ 83/682; 83/685; 83/694; 83/923
[58] Field of Search ............ 83/682, 40, 41, 620, 83/652, 656, 681, 685, 914, 923, 694

[56] References Cited

U.S. PATENT DOCUMENTS

| | | | |
|---|---|---|---|
| 384,532 | 6/1888 | Knowlton | 83/682 |
| 2,501,682 | 3/1950 | Kuchman | 83/681 X |
| 2,839,306 | 6/1958 | Bayless | 83/914 X |
| 3,517,580 | 6/1970 | Sturm | 83/682 X |
| 4,463,637 | 8/1984 | Delio et al. | 83/923 X |
| 5,067,339 | 11/1991 | Pirchl | 83/620 X |

FOREIGN PATENT DOCUMENTS

| | | |
|---|---|---|
| 4034278 | 5/1991 | Germany . |
| 4035857 | 5/1991 | Germany . |
| 986787 | 3/1965 | United Kingdom . |
| 2238972 | 6/1991 | United Kingdom . |
| 2239620 | 7/1991 | United Kingdom . |

*Primary Examiner*—Rinaldi I. Rada
*Assistant Examiner*—Clark F. Dexter
*Attorney, Agent, or Firm*—Evenson, McKeown, Edwards & Lenahan

[57] ABSTRACT

A trimming tool for trimming drawn parts over their complete periphery and for the simultaneous transverse cutting of the waste strip which has been cut off achieves complete and fragment-free transverse cutting of the waste strip by way of a low-maintenance, reliable tool which does not limit the space for introducing and removing the workpiece. The transverse cutting takes place by rectilinear further motion of a transverse cutter integrated in a fixed location in the upper tool. Its shear edge is freed in ample time by a controlled escape motion of a make-up cutter. The make-up cutter permits a complete and clean trim cut to be carried out on the workpiece and also permits the shear edge of the transverse cutter to extend right up to the trim shear edge. Because of the rectilinear downward motion of the transverse cutter, the waste strip is also sheared off cleanly and without cracks as far as the innermost trim cut edge.

7 Claims, 3 Drawing Sheets

TRIMMING TOOL FOR TRIMMING DRAWN PARTS AND FOR SIMULTANEOUS TRANSVERSE CUTTING

BACKGROUND AND SUMMARY OF THE INVENTION

The present invention relates to a trimming tool for trimming drawn parts over their complete periphery and for the simultaneous transverse cutting of the waste strip which has been cut off.

A known trimming tool is disclosed, for example, in German Offenlegungsschrift No. 4,034,278, and consists of a lower tool accepting the drawn part and defining its position and a two-part upper tool which can be lowered on the drawn part to be trimmed, which is inserted into the lower tool. A lower trimming shear-cutter following the contour of the trim and corresponding in three dimensions to the edge shape of the drawn part placed thereupon is formed on the lower tool. The contact surface acting to support the drawn part on the lower trimming shear-cutter is located within the closed shear edge trace of the lower trimming shear-cutter. The two-part upper tool is formed from a holding-down part and an upper trimming shear-cutter. In its plan and surface shape, the holding-down part corresponds negatively to the lower trimming shear-cutter and comes into contact with the drawn part first. The outermost contour line limiting the contact surface of the holding-down part towards the outside coincides with the shear edge extent of the lower trimming shear-cutter. The upper trimming shear-cutter surrounds the holding-down part and is guided so that it can move relative to it in the shear direction. Its shear edge likewise coincides with the shear edge extent of the lower trimming shear-cutter but only touches the inserted drawn part after a time delay relative to the contact by the holding-down part and, interacting with the lower trimming shear-cutter, shears off, all round, the edge of the drawn part which has to be trimmed.

For transverse cutting of the waste strip with the known trimming tool, a plurality of lower transverse cutters are mounted in fixed location; outside the shear edge of the lower trimming shear-cutter and transverse to it with their shear edge offset downwards. Pivotable shear bodies are mounted on the upper tool offset relative to the transverse cutters in the peripheral direction. A shear edge located congruently with the shear edge of the transverse cutter is formed on these shear bodies. In order to cut the waste strip transversely after it has been separated from the workpiece, the shear body is pivoted against the action of return structure by lowering the upper tool such that the waste strip is cut in the transverse direction.

This known appliance for the transverse cutting of the waste strip is, however, costly. On one hand, the space requirement for the pivotable shear body is large, as a consequence of which the access for inserting and removing the workpiece from the tool is also obstructed. On the other hand, the pivot bearings and the return structure of the shear body require frequent maintenance and repair because they are extremely heavily loaded. In addition, the retrofitting of tools already available with such a transverse cutting appliance, if possible at all, is awkward and expensive.

Another trimming tool with an integrated transverse cutting device is disclosed in German Offenlegungsschrift No. 4,035,857. There, the transverse cutters are pivotably supported in the trimming shear-cutter of the upper tool and extend right up to the shear edge of the trimming shear-cutter; their transverse edge forms part of the shear edge for the trim cut. The pivoting axis of the transverse cutter is located at the same height as the end shear edge which effects the cut. For the transverse cutting of the waste strip separated from the drawn part, the pivotable shear-cutters are pivoted downwardly in a direction coincident with the downwards motion of the upper tool, the waste strip being respectively sheared off against a lower, transverse cutter in a fixed location which, however, has to be arranged offset downwards relative to the lower dead center of the upper tool so that it does not interfere with the peripheral trimming of the workpiece which has to take place first. Because of the pivoting motion of the transverse cutter, the outermost, workpiece end of the shear edge of the transverse cutter moves on a circular arc which becomes more and more distant from the inner edge of the waste strip with increasing downward motion. Consequently, it is not possible to achieve the result that the transverse cutter shears through the waste strip completely and right up to the inner, peripherally extending cut edge. In the known trimming tool, the result is rather that a small part of the cut is torn. During this tearing, however, small workpiece particles are often released from the separating location of the waste strip and fly around in an uncontrolled manner so that they can pass into the tool and onto the workpiece where, during further processing, they leave impressions which cannot be removed, or can only be removed with an unacceptable level of rework.

An object of the present invention is to achieve complete and fragment-free transverse cutting of the waste strip by way of a low-maintenance, reliable tool which does not limit the space for introducing and removing the workpiece.

The foregoing object has been achieved, according to the present invention, by a trimming tool having a lower tool portion accepting and defining a position of the drawn part, which lower tool has a lower trimming shear-cutter corresponding with a desired trim contour and corresponding in three dimensions to an edge shape of the drawn part placed thereon, a support surface for supporting the drawn part on the lower trimming shear-cutter located within a closed shear edge trace of the lower trimming shear-cutter. A multi-part upper tool is arranged to be lowered onto the drawn part to be trimmed to be inserted into the lower tool, and a holding-down part in the upper tool is arranged to make contact initially and with a defined force on the drawn part configured to negatively corresponding in a plan and surface shape to the lower trimming shear-cutter and whose outermost contour line limiting a contact surface thereof towards the outside coincides with a shear edge extent of the lower trimming shear-cutter. An upper trimming shear-cutter is provided in the upper tool so as to surround the holding-down part and be movably guided relative thereto in the shear direction and whose shear edge coincides with the shear edge extent of the lower trimming shear-cutter but only touches the inserted drawn part after a time delay relative to the contact by the holding-down part and, interacting with the lower trimming shear-cutter, shears off, all around, the waste strip of the drawn part which has to be trimmed. A plurality of lower transverse cutters is arranged in accordance with the present invention outside the shear edge of the lower trimming shear-cutter and is distributed around the periphery and mounted in a fixed location transverse to the periphery, the shear edge of the transverse cutters reaching but located offset downward relative to the shear edge of the lower trimming shear-cutter. A plurality of upper transverse cutters is mounted on the upper trimming shear-cutter, and has edges respectively congruent with the shear edges of the lower transverse cutters, cutter bodies of the upper transverse cutters being located offset relative to one another in the peripheral direction, the shear edges of the upper transverse cutters reaching to the shear edge of the upper trimming shear-cutter, and the shear edge of the upper trimming shear-cutter being interrupted, in the region of each upper transverse cutter, by a dimension corresponding at least to the cutter body thickness of the lower transverse cutter.

A make-up cutter is provided in the region of the interruption of the shear edge of the upper trimming shear-cutter, so as to fill the interruption and is movably guided within the upper trimming shear-cutter in the shear direction and is held by a controllable support in a lower rest position relative to the upper trimming shear-cutter, the shear edge of which, as viewed both in the shear direction and transverse thereto, follows the remainder of the contour extent of the upper trimming shear-cutter in the rest position and effects an uninterrupted extent of the shear edge of the upper trimming shear-cutter.

The support for the make-up cutter is configured either controllably or flexibly as a function of the stroke such that, at the latest, when the make-up cutter of the upper transverse cutter makes contact on the lower transverse cutter, the support frees the make-up cutter so that the make-up cutter can automatically escape upwards within the upper trimming shear-cutter sufficiently far for the shear edge of the upper transverse cutter to be able to be freed over its complete length as far as the shear edges of the trimming shear-cutter.

The transverse cutting in the tool of the present invention takes place by rectilinear further motion of a transverse cutter integrated in a fixed location in the upper tool. Its shear edge is freed in sufficient time by an escape motion of a make-up cutter. This escape motion can take place in both a controlled manner and by force storage elements, in particular by a spring. The make-up cutter permits, on one hand, a complete and clean trim cut to be carried out on the workpiece and, on the other hand, permits the shear edge of the transverse cutter to extend right up to the trim shear edge. Because of the rectilinear downward motion of the transverse cutter, the waste strip is also sheared off cleanly and without cracks as far as the innermost trim cut edge. Uninterrupted operation is also possible because of the integration of the transverse cutter in a fixed location in the upper tool.

The transverse cutting of the waste strip, furthermore, takes place by components which are substantially smaller compared with the transverse cutting appliance pointed out in the state of the art. The access to the workpiece with the tool open is not impaired by this. A further advantage of the invention is that the appliance according to the invention can be manufactured at low cost and, in addition, tools already existing can also be retrofitted at low cost.

BRIEF DESCRIPTION OF THE DRAWINGS

These and other objects, features and advantages of the present invention will become more readily apparent from the following detailed description when taken in conjunction with the accompanying drawings wherein.

DETAILED DESCRIPTION OF THE DRAWINGS

Figure 1:
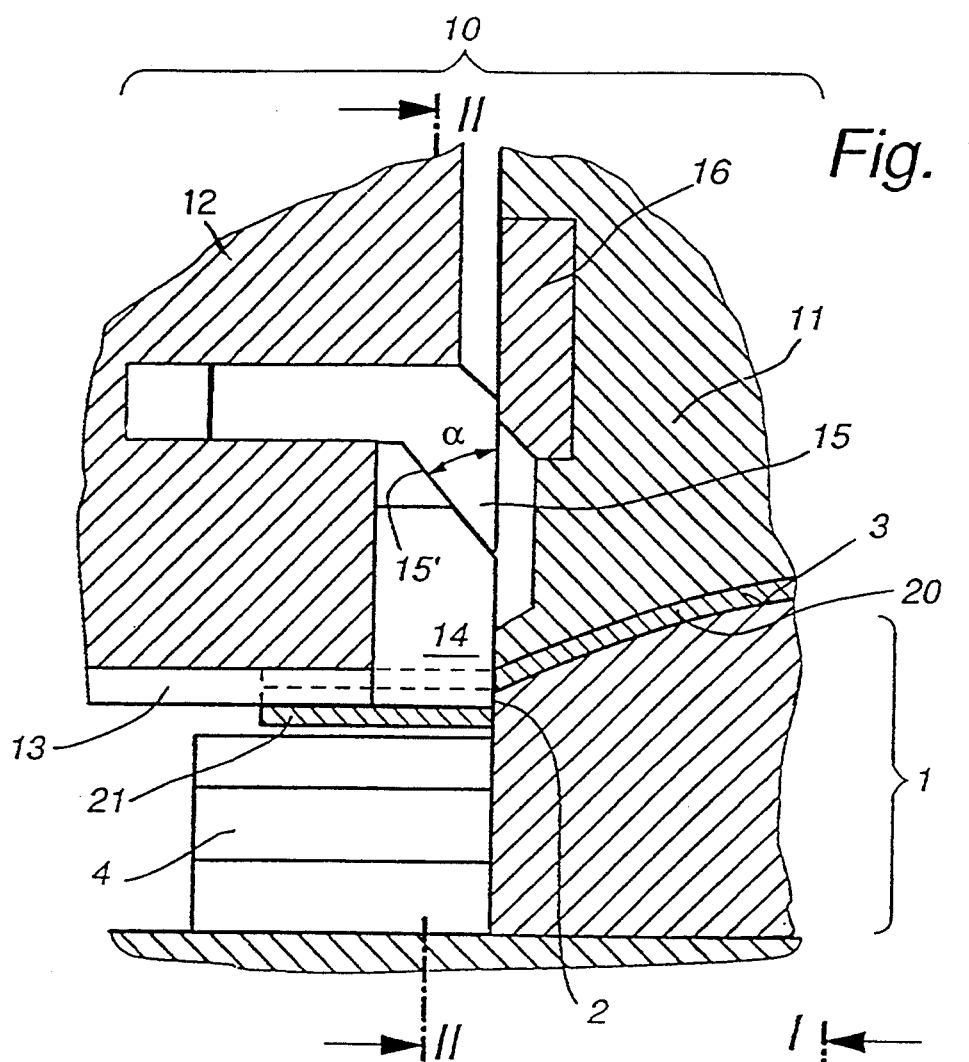
FIG. 1 is a sectional view through a portion of the trimming tool of the present invention along line I—I of FIG. 2, in the position immediately before the transverse cutting of the waste strip.
Figure 2:
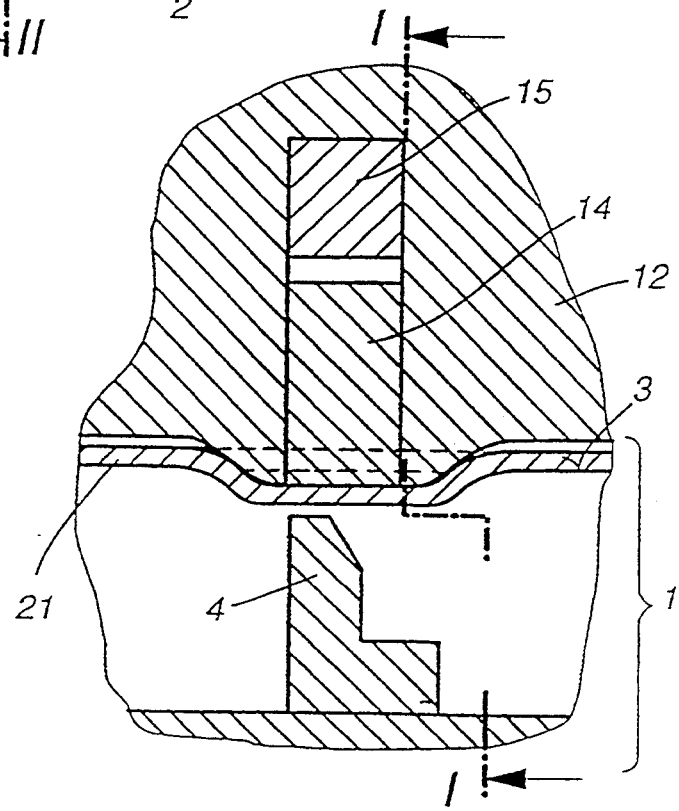
FIG. 2 is a sectional view through the trimming tool along line II—II of FIG. 1.

The trimming tool shown in FIGS. 1 to 4 is used for trimming drawn parts 20 over their complete periphery and for the simultaneous transverse cutting of the waste strip 21 which has been cut off. In FIGS. 1 and 2, the tool is represented in a position immediately before the transverse cutting of the waste strip 21. The drawn part 20 is located in a defined position in the lower tool 1. The lower tool 1 has a lower trimming shear-cutter 2 extending to correspond with the desired contour of the trim and corresponding in three dimensions to the edge shape of the drawn part 20 placed thereon. The support surface 3 used for supporting the drawn part on the lower trimming shear-cutter 2 is located within the closed shear edge trace of the lower trimming shear-cutter 2.

The two-part upper tool 10 is lowered onto the drawn part 20 to be trimmed, which is inserted in the lower tool 1. The holding-down part 11, which negatively corresponds in its plan and surface shape to the lower trimming shear-cutter 2, makes contact first on the drawn part 20 and does so with a defined force. The outermost contour line of the holding-down part 11 limiting its contact surface towards the outside coincides with the shear edge extent of the lower trimming shear-cutter 2. An upper trimming shear-cutter 12, which surrounds the holding-down part 11, is movably guided relative thereto in the shear direction and whose shear edge likewise coincides with the shear edge extent of the lower trimming shear-cutter 2. The shear edge, however, only touches the inserted drawn part 20 after a time delay relative to the contact by the holding-down part 11 and, interacting with the lower trimming shear-cutter 2, shears off, all round, the waste strip 21 of the drawn part 20 which has to be trimmed. Outside the shear edge of the lower trimming shear-cutter 2 and distributed around the periphery a plurality of lower transverse cutters 4 is mounted in a fixed location transverse to the periphery. The transverse cutters 4 have, in the simplest situation, a horizontal shear edge but, in any event, a shear edge extending in a position specified by the shape of the edge region of the drawn part. The shear edge of the transverse cutters 4 is proximate to the shear edge of the lower trimming shear-cutter 2 but is located offset downwards relative to this shear edge. A plurality of upper transverse cutters 13 is mounted on the upper trimming shear-cutter 12. The shear edges of these transverse cutters are respectively congruent with those of the lower transverse cutters but their cutter bodies being located offset relative to one another in the peripheral direction. The shear edges of the upper transverse cutters 13 likewise are proximate the shear edge of the upper trimming shear-cutter 12.

In the region of each upper transverse cutter 13, the shear edge of the upper trimming shear-cutter 12 is interrupted by a guide slot having a dimension corresponding at least to the cutter body thickness of the lower transverse cutter 4. In the region of the guide slot of the shear edge of the upper trimming shear-cutter 12, a make-up cutter 14 is arranged which fills the guide slot and is movably guided within the upper trimming shear-cutter 12 in the shear direction but is held by a controllable support described in more detail below in a lower rest position relative to the upper trimming shear-cutter 12. The make-up cutter 14 is cut out from the upper trimming shear-cutter 12 by a conical wire erosion cut following the transverse cut contour of the make-up cutter 14. The shear edge of the make-up cutter 14, viewed both in the shear direction and transversely thereto, follows the rest of the contour extent of the upper trimming shear-cutter 12 in the rest position and effects an uninterrupted extent of the shear edge of the upper trimming shear-cutter 12.

Because the guide of the make-up cutter 14 narrows towards the bottom within the trimming shear-cutter 12, the shear edge of the make-up cutter 14 is flush with and clearance-free relative to the shear edge of the upper trimming shear-cutter 12 in the lower extreme position within the narrowing guide. The controllable support of the make-up cutter 14 is formed by a wedge 15 movably guided approximately parallel to the shear edge of the transverse cutter 13 in the upper trimming shear-cutter 12 and acting as the barrier body for an escape motion of the make-up cutter 14. The displacement position of the wedge 15 is controlled as a function of the stroke of the upper trimming shear-cutter 13 relative to the holding-down part 11. Consequently, the make-up cutter 14 can escape upwardly within the upper trimming shear-cutter sufficiently far for the shear edge of the upper transverse cutter 13 to be freed over its complete length as far as the shear edges of the trimming shear-cutter 12. The control of the wedge 15 takes place by way of a control cam 16 mounted on the holding-down part 11.

Figure 3:
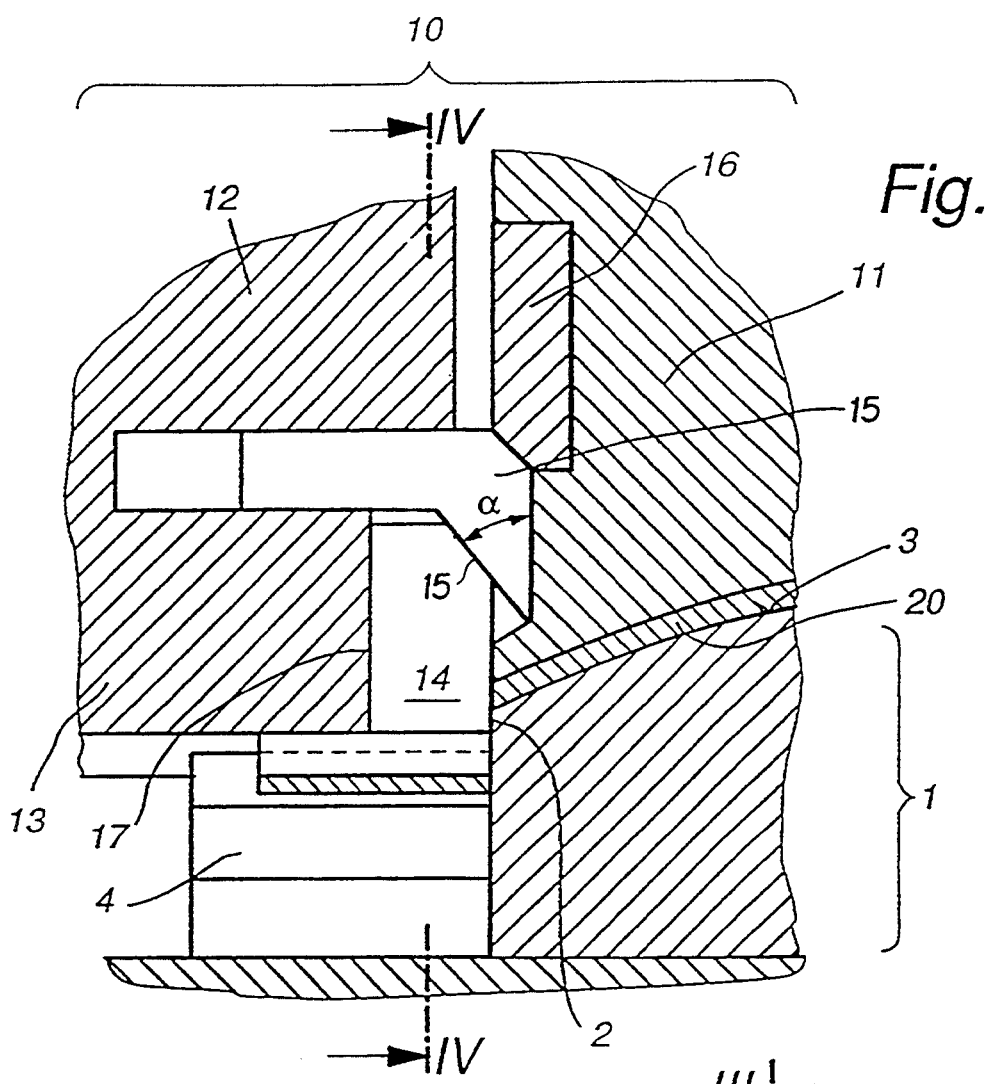
FIG. 3 is a sectional view similar to FIG. 1 through the trimming tool along line III—III of FIG. 4 but in a position reached after the transverse cutting of the waste strip.
Figure 4:
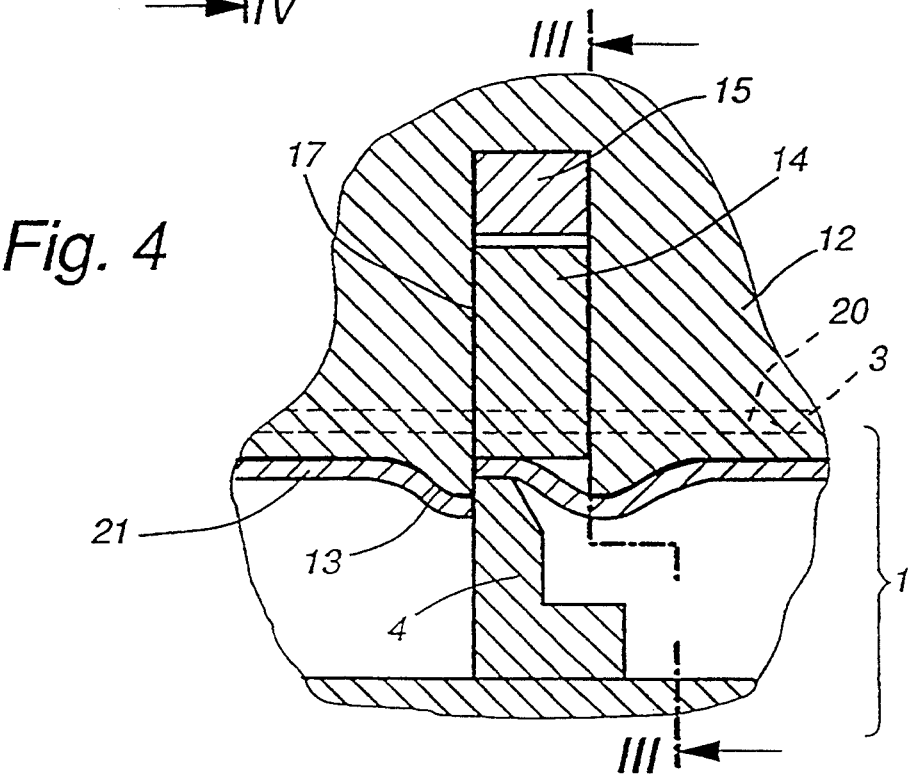
FIG. 4 is a sectional view similar to FIG. 2 through the trimming tool along line IV—IV of FIG. 3.
Figure 5:
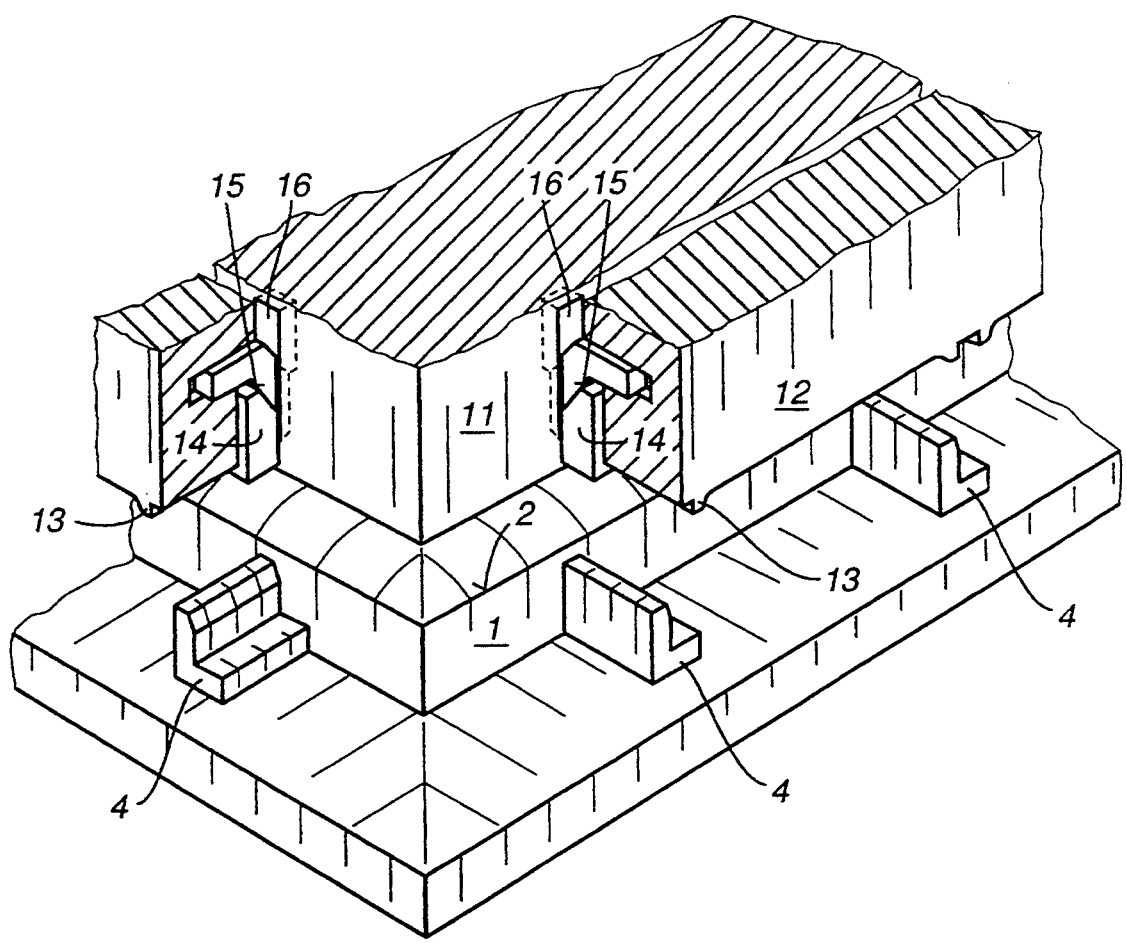
FIG. 5 is a perspective view of a relevant portion of the trimming tool shown in FIGS. 1-4.

In the position of the upper trimming shear-cutter shown in FIG. 1, the upwardly acting force on the make-up cutter 14 is introduced onto the obliquely located working surface 15' of the wedge 15, so that the force is subdivided into a vertical component and a horizontal component. The vertical component of the force is taken up by the upper tool 10 whereas the horizontal component presses the wedge 15 sideways in the direction of the holding-down part 11. Motion of the wedge 15 in this direction is prevented by the control cam 16 during the cutting of the waste strip 21 from the drawn part 20. On further downward motion of the upper trimming shear-cutter, the control cam 16 frees a sideways motion of the wedge 15. As soon as the lower transverse cutter 4 subjects the make-up cutter 14 to the waste strip 21, as shown in FIG. 3 and 4, the makeup-cutter 14 escapes upwardly, pushing the wedge 15 to the side. The upper and lower transverse cutters 13, 4 carry out a shear motion and cut the waste strip 21 in the transverse direction. Because the two transverse cutters 13, 4 extend flush as far as the lower trimming shear-cutter 2, the waste strip is cut over its complete width so that chip formation by tearing cannot occur.

The upward motion of the upper tool 10 takes place after the transverse cut. Because the region of the wedge 15 interacting with the control cam 16 has a flat chamfer parallel to the working surface 15' interacting with the make-up cutter, the wedge 15 is pushed back into the initial position by the control cam 16 during a now upwardly directed motion of the upper trimming shear-cutter 12 relative to the holding-down part 11. As a result, the make-up cutter 14 is pushed downwardly again, if it has not already fallen back due to the effect of gravity, into the lower relative position shown in FIGS. 1 and 2, and therefore again closes the contour of the upper trimming shear-cutter 12.

The make-up cutter is advantageously separated out from the upper trimming shear-cutter 12 by wire erosion. The separating gap 17 defines the clearance of the make-up cutter 14 in the guide. Because the guide of the make-up cutter 14 is configured so that it narrows towards the bottom and its shear edge is flush with the shear edge of the upper trimming shear-cutter 12 by being ground flush, the make-up cutter 14 is held without clearance in this position. This ensures a chip-free cut of the waste strip 21 by the upper trimming shear-cutter 12 along the complete contour of the drawn part 20.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A trimming tool for trimming a drawn part over a complete periphery as the drawn part and then immediately transverse cutting of a waste strip which has been trimmed off from the drawn part, comprising a lower tool for locating the drawn part in a predetermined position, the lower tool having a lower trimming shear-cutter corresponding with a desired trim contour and corresponding in three dimensions to a predetermined edge shape for the drawn part placed thereon, a support surface on the lower tool for supporting the drawn part on the lower trimming shear-cutter located within a closed shear edge trace defined by the lower trimming shear-cutter; a multi-part upper tool arranged to be lowered relatively in a shear direction toward the lower tool and onto the drawn part to be trimmed, a holding-down part in the upper tool arranged in operative relation to the lower trimming shear-cutter to make contact initially and with a defined force on the drawn part, said holding-down part being configured to negatively correspond in a plan and surface shape to the lower trimming shear-cutter and having an outermost contour line outwardly limiting a contact surface thereof which coincides with a shear edge extent of the lower trimming shear-cutter; an upper trimming shear-cutter in the upper tool so as to surround the holding-down part and be movably guided relative thereto in the shear direction and having a shear edge which coincides with the shear edge extent of the lower trimming shear-cutter but only touches the inserted drawn part after a time delay relative to the contact by the holding-down part and, interacting with the lower trimming shear-cutter, shears off completely the waste strip of the drawn part which has to be trimmed; a plurality of lower transverse cutters arranged outside the shear edge of the lower trimming shear-cutter and distributed around the periphery and mounted in a fixed location transverse to the periphery, the transverse cutters having a shear edge adjacent and offset relative to the shear edge of the lower trimming shear-cutter; a plurality of upper transverse cutters mounted on the upper trimming shear-cutter in operative relationship with the lower transverse cutters, and having shear edges respectively mating with the shear edges of the lower transverse cutters, the upper transverse cutters being located offset relative to one another in the peripheral direction, the shear edges of the upper transverse cutters adjoining the shear edge of the upper trimming shear-cutter, and the shear edge of the upper trimming shear-cutter being interrupted by a guide slot, in each upper transverse cutter, wherein the guide slot has a dimension corresponding at least to a cutter body thickness of a corresponding one of the lower transverse cutters; each upper transverse cutter further includes a make-up cutter provided in the guide slot so as to fill the guide slot, said make-up cutter being movably guided within the upper trimming shear-cutter in the shear direction and fixedly maintained by a controllable support means in a lower rest position relative to the upper trimming shear-cutter, a shear edge of the make-up cutter, as viewed both in the shear direction and transverse thereto, follows a remaining contour extent of the upper trimming shear-cutter in the rest position and effects an uninterrupted extent of the shear edge of the upper trimming shear-cutter; and the support means for the make-up cutter is movably arranged in the upper tool and configured to move relative to the make-up cutter as a function of a stroke of the upper tool relative to the lower tool such that when the make-up cutter makes contact on the corresponding lower transverse cutter, the support means moves so that the make-up cutter can automatically moves towards the upper tool within the guide slot of the upper trimming shear-cutter sufficiently far for the shear edge of the upper transverse cutter to be exposed over its complete length to the shear edge of the trimming shear-cutter.

2. The trimming tool according to claim 1, wherein the controllable support means of the make-up cutter is a wedge movably guided approximately parallel to the shear edge of the upper transverse cutter in the upper trimming shear-cutter and positioned adjacent the make-up cutter to act as a barrier body for said movement toward the upper tool by the make-up cutter, the displacement position of this wedge being controllable as a function of the stroke of the upper trimming shear-cutter relative to the holding-down part.

3. The trimming tool according to claim 2, wherein a control cam mounted on the holding-down part is positioned adjacent the wedge and provides control of the wedge.

4. The trimming tool according to claim 3, wherein a region of the wedge interacts with the control cam and this region has a flat chamfer parallel to a working surface of the wedge, said working surface operatively interacting with the make-up cutter.

5. The trimming tool according to claim 2, wherein an angle of inclination of a working surface of the wedge is about 45° and the working surface is oblique relative to the shear edge of the upper trimming shear cutter and faces towards the make-up cutter and the upper transverse cutter.

6. The trimming tool according to claim 1, wherein the shear edge of the make-up cutter is flush with the shear edge of the upper trimming shear-cutter in a lower, clearance-free extreme position within the guide slot.

7. The trimming tool according to claim 6, wherein the make-up cutter is separated from the upper trimming shear-cutter in the guide slot by a separating gap produced by one of wire erosion, laser cutting and electron beam cutting and following a cross-sectional contour of the make-up cutter.

* * * * *